United States Patent
Whitney (10) Patent No.: US 9,696,915 B2
(45) Date of Patent: *Jul. 4, 2017

(54) TAPE DRIVES GENERATING BEST ACCESS ORDER OF RANDOMLY STORED FILES ON A TAPE

(71) Applicant: Oracle International Corporation, Redwood City, CA (US)

(72) Inventor: Bradley Edwin Whitney, Erie, CO (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/336,457

(22) Filed: Oct. 27, 2016

(65) Prior Publication Data

US 2017/0046077 A1      Feb. 16, 2017

Related U.S. Application Data

(63) Continuation of application No. 14/288,448, filed on May 28, 2014, now Pat. No. 9,513,818.

(51) Int. Cl.
| | |
|---|---|
| *G06F 13/12* | (2006.01) |
| *G06F 13/38* | (2006.01) |
| *G06F 3/06* | (2006.01) |
| *G11B 5/008* | (2006.01) |
| *G06F 17/30* | (2006.01) |

(52) U.S. Cl.
CPC .......... *G06F 3/0613* (2013.01); *G06F 3/0643* (2013.01); *G06F 3/0659* (2013.01); *G06F 3/0682* (2013.01); *G06F 17/30091* (2013.01); *G11B 5/00817* (2013.01); *G06F 2003/0698* (2013.01)

(58) Field of Classification Search
None
See application file for complete search history.

(56) References Cited

U.S. PATENT DOCUMENTS

| | | | |
|---|---|---|---|
| 5,787,473 A | 7/1998 | Vishlitzky et al. | |
| 6,349,356 B2 | 2/2002 | Basham et al. | |
| 6,763,427 B1 * | 7/2004 | Doi | G11B 5/78 |
| | | | 711/100 |
| 8,566,517 B1 * | 10/2013 | Sims | G06F 3/065 |
| | | | 360/72.1 |

(Continued)

*Primary Examiner* — Elias Mamo
(74) *Attorney, Agent, or Firm* — Marsh Fischmann & Breyfogle LLP; Kent A. Lembke (57) ABSTRACT

A tape drive adapted for providing a best access order for files or data sets on a tape loaded into the tape drive. The tape drive includes a processor and memory storing a file location table for the tape. The file location table includes identifiers for a plurality of files on the tape and location information for the plurality of files on the tape. The tape drive includes an order determination module, executed by the processor, processing an order request. The order request, from a host or user, includes a list of the files on the tape from which to generate, based on the location information in the file location table, a reordered list defining an order for accessing the files on the tape. The reordered list or best access order has (or produces via tape drive access) an access time for the files that is minimal or reduced.

20 Claims, 10 Drawing Sheets

(56) References Cited

U.S. PATENT DOCUMENTS

| | | |
|---|---|---|
| 9,263,064 B2 | 2/2016 | Katagiri et al. |
| 2003/0028831 A1 | 2/2003 | Bickers et al. |
| 2006/0164744 A1 | 7/2006 | Greco et al. |
| 2012/0154946 A1* | 6/2012 | Katagiri ............... G06F 3/0611 360/48 |
| 2013/0117239 A1* | 5/2013 | Hasegawa ......... G06F 17/30091 707/687 |

* cited by examiner

FIG. 10

TAPE DRIVES GENERATING BEST ACCESS ORDER OF RANDOMLY STORED FILES ON A TAPE

CROSS-REFERENCE TO RELATED APPLICATIONS

This application is a continuation of U.S. patent application Ser. No. 14/288,448, filed May 28, 2014, which is incorporated herein by reference in its entirety.

BACKGROUND

1. Field of the Description

The present description relates to magnetic tape data storage and, in particular, to methods and systems for accessing data segments or files (or blocks) on a magnetic tape (or, more simply, "tape") in a more time efficient manner.

2. Relevant Background

For decades, magnetic tape data storage has offered cost and storage density advantages over many other data storage technologies including disk storage. A typical medium to large-sized data center will deploy both tape and disk storage to complement each other and with the tape storage often used for backup and archival data storage. Due to the increased need for securely storing data for long periods of time and due to the low cost of tape, it is likely that tape-based data storage will continue to be utilized and its use will only expand for the foreseeable future.

Briefly, magnetic tape data storage uses digital recording on to magnetic tape to store digital information, and the tape is packaged in cartridges and cassettes (i.e., the storage media or simply "media"). The device that performs writing and reading of data is a tape drive, and tape drives are often installed within robotic tape libraries, which may be quite large and hold thousands of cartridges to provide a tremendous amount of data storage (e.g., each tape may hold several terabytes of uncompressed data).

Presently, tape data have been accessed in the order that the data was written upon the tape, which is typically random with each file being at spaced apart locations on the tape. For example, a host may read a set of files on a tape, such as a set of files used to archive a particular set of data, via a tape drive containing that tape. The host would read the set of files in the order that they were written which may be very inefficient as the files may be located in numerous different locations that may be in different wraps, in different servo bands, and on an opposite side of the tape centerline (or in a different head travel direction). This inefficiency has been tolerated in the past, but the access time has been increasing as tapes have been more and more densely written with increasing numbers of wraps and overall tape length.

Hence, there remains a need for improved methods (e.g., software programs or applications) for use in determining better ways to access data files or blocks on a tape. Preferably, such methods would be useful with existing and yet to be developed hosts, tape drives, tapes/media, and other components of a tape-based data storage system.

SUMMARY

To address the above and other issues, methods and tape drives adapted to perform such methods are described that enhance access to sets of files on a tape. The inventor recognized that the data storage industry has provided methods, such as a SCSI command set, to allow a host (or tape drive or tape library user) to give a list of files (or data sets) to a tape drive for the tape drive to sort for the host (or user). The description that follows provides an order determination method that may be performed by software programs (algorithms) running on a tape drive.

The order determination method is adapted for sorting the list of files (or data sets) provided by the host (or user) for best (or at least improved) performance using a relatively small amount of time to produce the reordered list of files (also called "best access order" herein). To this end and briefly, the method involves receiving a list of files or data sets to retrieve on a tape, and the method reorders this list of files into the new order to access the files or data set. The "best" order is chosen as the one that provides the least amount of time that is taken to locate and read all files or data sets on a serpentine recorded tape. The method is adapted to be efficient so as to limit the reorder time to a few seconds for most applications (e.g., most tapes written with relatively large numbers of files or data sets in today's tape storage industry).

More particularly, a tape drive is described that is specially adapted for providing a best access order for files on a tape. The tape drive includes a processor and memory storing a file location table for a tape loaded into the tape drive. The file location table includes identifiers for a plurality of files on the tape and location information for the plurality of files on the tape. The tape drive further includes an order determination module, executed by the processor, processing an order request. The order request (from a host or user) includes a list including a number of the files on the tape from which to generate, based on the location information in the file location table, a reordered list defining an order for accessing the number of the files on the tape. The reordered list or "best access order" has (or produces via tape drive access) an access time for the files that is less than for an order of the files in the list of the order request.

In some cases, the order determination module includes a factorial routine or program that is performed when the number of the files is less than or equal to a threshold value (such as 10), and the factorial routine generates a set of all possible orders for accessing the number of the files. In such cases, the order determination module further includes a time determination routine processing each of the possible orders in the set of all possible orders to determine an access time for the number of the files. Still further, the order determination module selects the reordered list as an order from the set of all possible orders with a shortest of the access times. In practice, the time determination routine may determine the access times based on a distance between an end of file location and a start of file location for pairs of adjacent ones of the files in each of the possible orders and also by adding or applying time penalties when a next one of the files in one of the possible orders is in a different wrap or in a different servo band on the tape. Further, a time determination table can be stored in the memory such that the determination of the access times comprises looking up travel times between pairs of the end and start of file locations in the reordered list of files.

In some implementations, the order determination module includes a next closest in same direction routine outputting a first reordered list and a next closest in both directions routine outputting a second reordered list. Both of these routines are performed when the number of the files is greater than the threshold value for factorial ordering. Then, the order determination module compares an access time associate with the first ordered list with an access time associated with the second reordered list to determine which is shorter for use or selection as the reordered list (or best access order) returned to the host or user that provided the order request.

In these implementations, the next closest in same direction routine generates the first reordered list by choosing next ones of the files in the list of the order request by finding a next file that has a closest start of file location relative to a start of file of a current one of the files in the list, with the next file being in same head travel direction as the current one of the files. Also, the next closest in both directions routine generates the second reordered list by choosing next ones of the files in the list of the order request by finding a next file that has closest start of file location relative to an end of file of a current one of the files in the list with the next file being in either head travel direction on the tape.

DETAILED DESCRIPTION

Briefly, a file access (or read) order determination method is provided that is implemented on a tape drive such that the tape drive responds to order requests from hosts (or users) with a best access order (reordered list of files). The best access order is chosen to provide a reduced (or minimum) access time to the set of files (or data sets or blocks) provided in the order request for a particular tape, e.g., a serpentine recorded tape.

Figure 1:
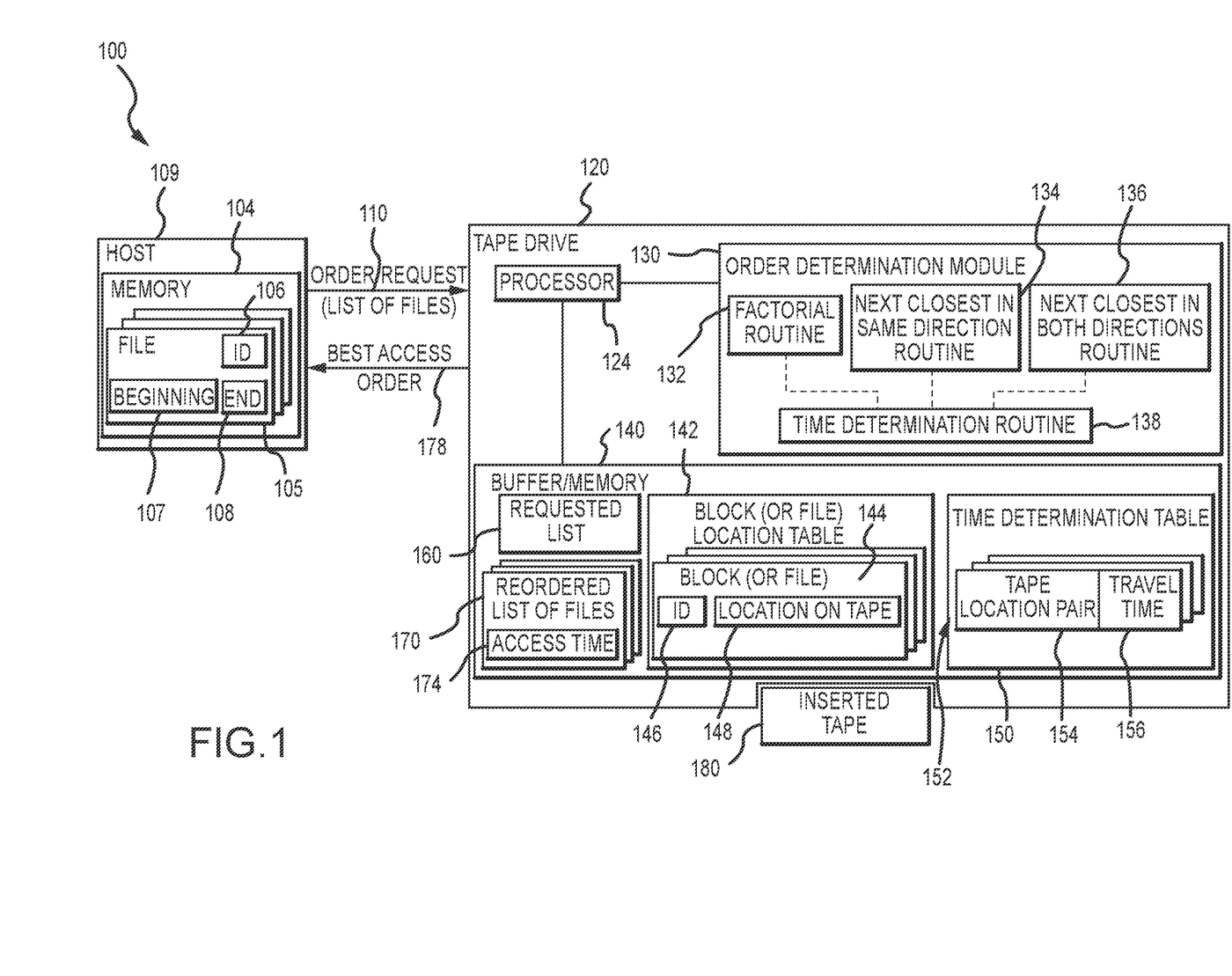
FIG. 1 is a functional block diagram of a portion of a tape storage system with a tape drive configured for performing the file order determination functions of the present description.

FIG. 1 illustrates a portion of a tape-based data storage system 100 configured to implement the order determination method or algorithm described herein. As shown, the system 100 includes a host or client 109 (e.g., any of a number of computer devices with processing capabilities) that has memory 104 storing records 105 for a plurality of files (or data sets). Each of the file records 105 includes a file identification (ID) 106 and also data 107, 108 on the beginning and ending of each file or data set, which is useful for defining the size or length of each file. During operations of the system 100, the host 109 acts to generate order requests 110 that are transmitted, in a wired or wireless manner, to a tape drive 120, with only one drive shown in system 100 but a typical system 100 would include a much larger number of drives as part of a library. Each order request 110 would include one and, more typically, 2 to 10 or more files associated with records 105 in a file list, and the list of files would include the IDs 106 and a file size or length.

The tape drive 120 receives the order request 110 for a tape 180 inserted into the tape drive 120 and operates to generate and return a best access order 178 to the host 109 for its use in reading the files in the order request in an order that is more efficient (with regard to access time). In practice, the files in the order request 110 often will simply be provided in file ID order, which would not provide a time efficient order for accessing the files during read/write operations. To provide reordering for efficient access, the tape drive 120 includes a processor 124 running or executing software (e.g., in a computer readable medium on drive 120) in the form of an order determination module 130.

The order determination module 130 is adapted to process the order request 110 to provide the best access order 178 through the use of a factorial routine 132 when the number of files in the list of the order request 110 is below a predefined threshold (e.g., 7 to 12 files with 10 being used as a threshold in some implementations of order determination module 130). When above this threshold number, the order determination module 130 is adapted to use first and second next closest routines 134, 136, with one being limited to next closest files in the same tape head travel direction and with one looking for next closest files in either head travel direction. The order determination module 130 further includes a time determination routine 138 that is run to assign head travel times (or a summation of times to move between each end of file to each start of file) for the orders provided by the three routines 132, 134, 136.

The tape drive 120 also includes a buffer or memory 140 managed by the processor 124 and used to store data useful for production of the best access order 178 by the order determination module 130. As shown, the processor 124 acts to store a file location table 142 for the inserted tape 180. For example, a tape 180 is loaded, and, in response, the tape drive 120 acts to read or determine identifiers and locations of each file on the tape 180. This information is stored by the processor 124 in a file location table 142 in file records 144 with IDs 146 and tape locations (e.g., file start locations) 148.

Figure 2:
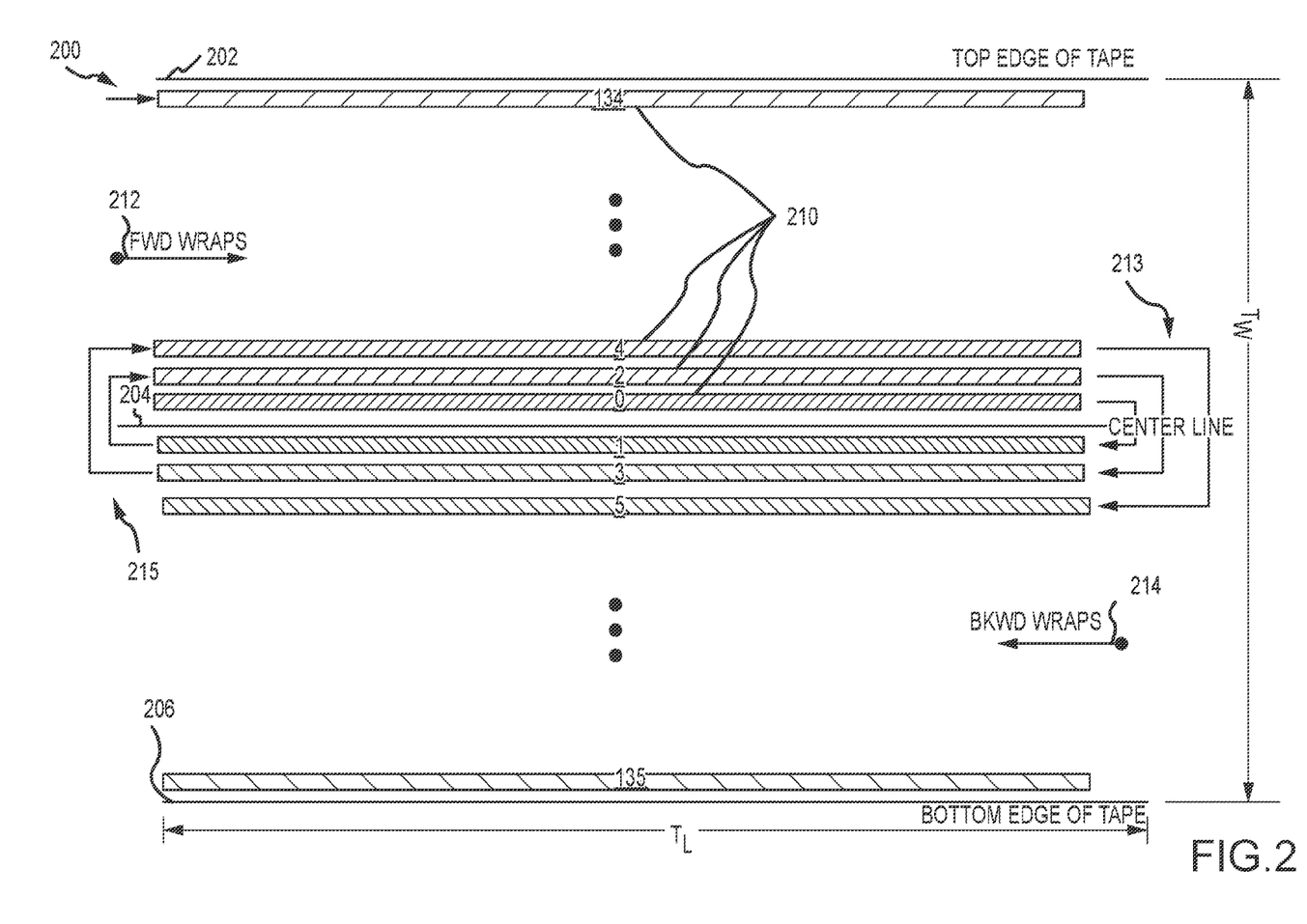
FIG. 2 illustrates schematically a tape or a tape cartridge with wraps in a serpentine layout.

In this regard, it may be useful to consider a typical tape 200 as shown in FIG. 2 that is written with a serpentine layout. The tape 200 has a top edge 202 spaced apart from a bottom edge 206 by the width, Tw, of the tape 200 (e.g., 0.5 inches or the like). The surface of the tape 200 also has a center line 204 that separates the forward wraps 210 as shown with arrow 212 from the backward wraps 210 as shown with arrow 214, with the lines 213 and 214 showing movement of the head (not shown) of the tape drive (such as drive 120 of FIG. 1) for next wrap 210 to write after completion of forward and backward wraps, respectively.

In many serpentine tape layouts, tape is recorded M tracks at a time (e.g., M may be 16 or 32 in the tape storage industry). Each wrap 210 is written from one end of the tape 200 to the other. There are N wraps on the tape 200, e.g., an industry standard tape has 136 wraps. The numbers provided on the wraps 210 show the order of writing on the tape 200 by a tape drive that provides the serpentine layout. Data is written with a tape head that moves vertically up and vertically down the tape 200 for each wrap 210. The files to recover in an order request may be randomly scattered on the tape 210.

Movement left and right (e.g., the tape length, $T_L$, may be up to about 1000 meters or more) can take significant amounts of time (e.g., up to 90 seconds or the like). Movement up and down, though, takes very little time (e.g., 0.75 seconds with tape width, $T_w$, of 0.5 inches). Hence, the inventor designed the order determination module 130 to provide best access orders 178 that attempt to read files or blocks that are relatively close on the tape 200 in the vertical direction before making large linear moves along the length of the track 200. The examples of FIGS. 7-10 show random data sets (e.g., files or data sets are larger in size but are typically shown to be in a single wrap) that are to be read (as indicated by a list in an order request) with arrowed lines showing one or more "best" access order for use in reading them by a host.

The processor 124 also stores in memory 140 a time determination table 150 that is used by the time determination module 138 to determine travel times between files in an access order provided by the routines 132, 134, 136. The time determination table 150 includes records 152 for numerous tape location pairs (or location points on the tape) 154, e.g., several thousand location pairs to many thousand pairs such as up to 64,000 or more pairs in some implementations. In each of these records 152, a travel time 156 is stored that defines an estimate of the time it would take a tape head of the drive 120 to move between points defined by pair 154.

The inventor recognized that the velocity of travel equation for a head over tape (which is moved over a head) in a tape drive 120 is typically very complex (e.g., due to the fact that the velocity is greater in the middle portions of the tape, such as about 10 meters/second, and less at each end, such as about 7 meters/second, following a parabolic-shaped or non-linear curve) such that it may be time consuming to solve during order determination by module 130. Hence, the inventor determined that travel times can be provided, using the travel velocity equation, ahead of time for expected location pairs (time to travel forward and back between two points or locations on a tape). Then, travel times between two adjacent files in one of the file access orders provided by routines 132, 134, 136 can be determined with a lookup (e.g., row and column look up) in table 150 to find/determine the travel time between the end of a first file in the order and a start of a second or next file in the order.

As shown, the memory 140 is also used to store the requested list of files 160, including file IDs and sizes, from the order request 110. This list of files 160 is accessed by the order determination module 130 along with the file location table 142 and time determination table 150 to generate sets of reordered lists of files 170 each with an associated access time 174 (calculated by the time determination routine 138). In brief, the order determination module 130 selects the reordered list 170 with the shortest access (or head travel) time 174, and this list 170 is returned to the host 102 as a best access order 178, which can then be used to read/write the list of files identified in the order request from/to the tape 180.

Figure 3:
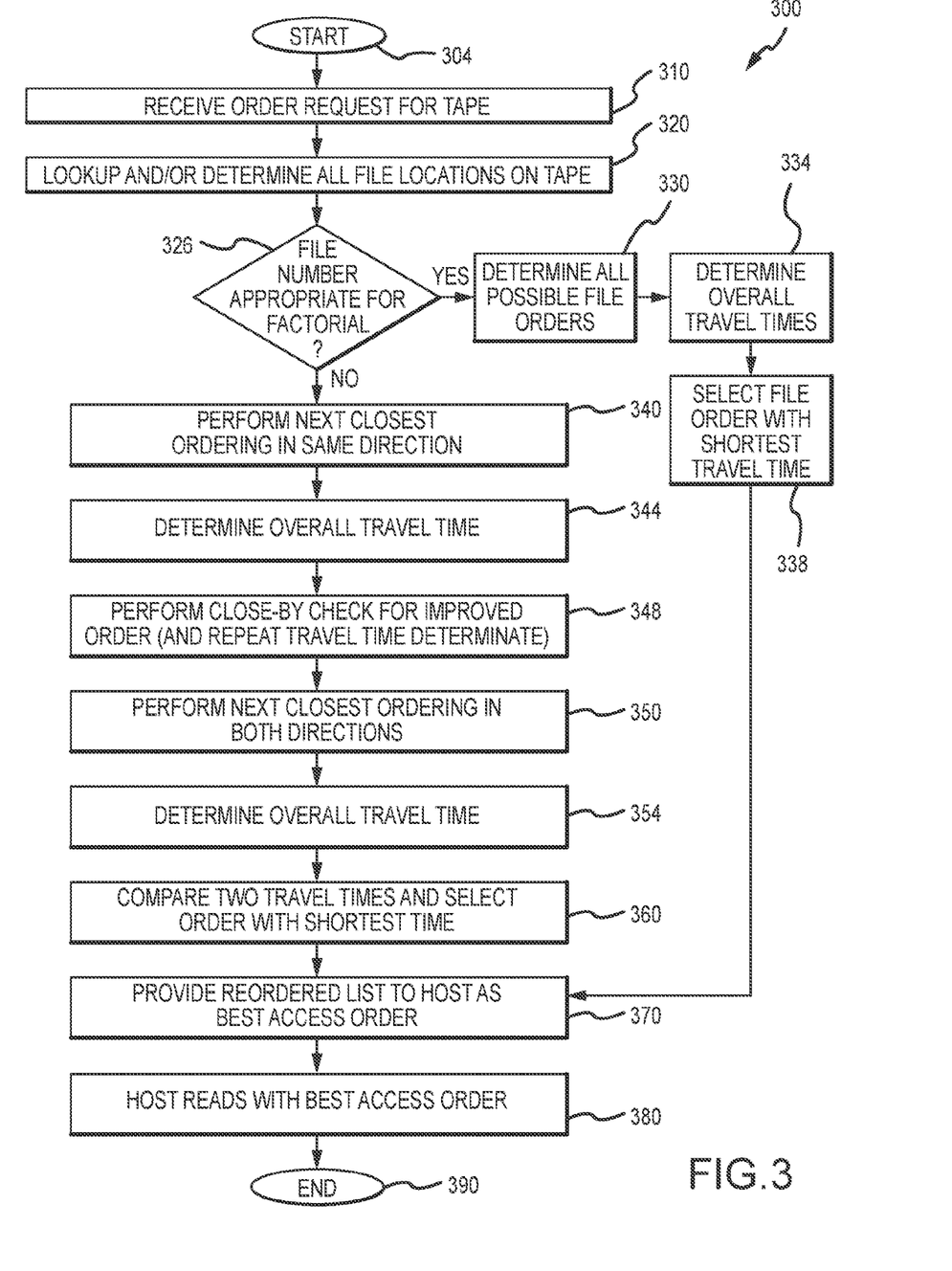
FIG. 3 is a flow diagram of a reorder method or process of the present description that may be performed using the system of FIG. 1 on a conventional tape media such as the tape of FIG. 2.

FIG. 3 illustrates a method 300 for finding a best access order for a list of files (or data sets) identified in an order request (such as from a host or from user input), and the method 300 may be performed by the order determination module 130 running on tape drive 120. The method 300 starts at 304 such as with the loading of an order determination module onto a tape drive and with the generation of a time determination table defining travel times between a large number (e.g., up to 64,000 or more) of pairs of points or locations on a tape. Step 304 may also involve loading a cartridge or tape into the tape drive to read a tape directory and to store a table in drive memory that has an ID and start location for each file on the tape.

The method 300 continues at 310 with receiving an order request for the tape. For example, a host or a user may provide a listing of files to be read with a request that they be reordered to provide more efficient access (reading and/or writing) when compared with simply reading in block or file ID order as is an existing access practice in the tape storage industry. Then, at 320, the method 300 includes looking up and/or determining all locations on the tape of the files in the listing of files in the received order request. Typically, the start location of each file can simply be looked up in the table, and this location may be the servo location of the file on the tape. The end location of the file may be in the table, too, for ready look up and retrieval or the end location of each file may be determined by using the size or length of the file provided in the order request (e.g., the list from the host or user may include the file ID and its size or length, and this length may simply be added to the start location).

The method 300 then continues at 326 with comparing the number of files in the list of files of the order request with a factorial routine threshold. The factorial process (carried out by routine or program 132 in the module 130 of FIG. 1) involves determining every possible order for the entire list of files in an order request. Hence, full factorial calculation of larger numbers of files would not be practical for providing a best access order within a matter of seconds (e.g., within about 5 to 10 seconds in many applications). To address this issue, a threshold number of files may be set such as 7 to 12 with 10 being used as the threshold in some prototypes of the method 300.

Then, at 326, if the file number is less than the threshold number, the method 300 continues at 330 with determining all possible file orders. This step is not done if the number is large, such as 3000 files, as this would take a very long time to sort. Often, the user/host will have a timeout of 30 seconds or the like. Therefore, the method 300 is configured to use full factorial search at step 330 when the number of files is small (on the order of 10 or less) and to use a next closest technique (e.g., steps 340-354) when the number of files in the order request exceeds this small number or threshold (e.g., 11 or more files). In some embodiments (not shown in FIG. 3), when the amount of data to restore approaches the whole tape, the method 300 can check for this condition (e.g., order request is for 80 percent or more of the tape) and resort to file recorded order as the best access order.

Figure 6:
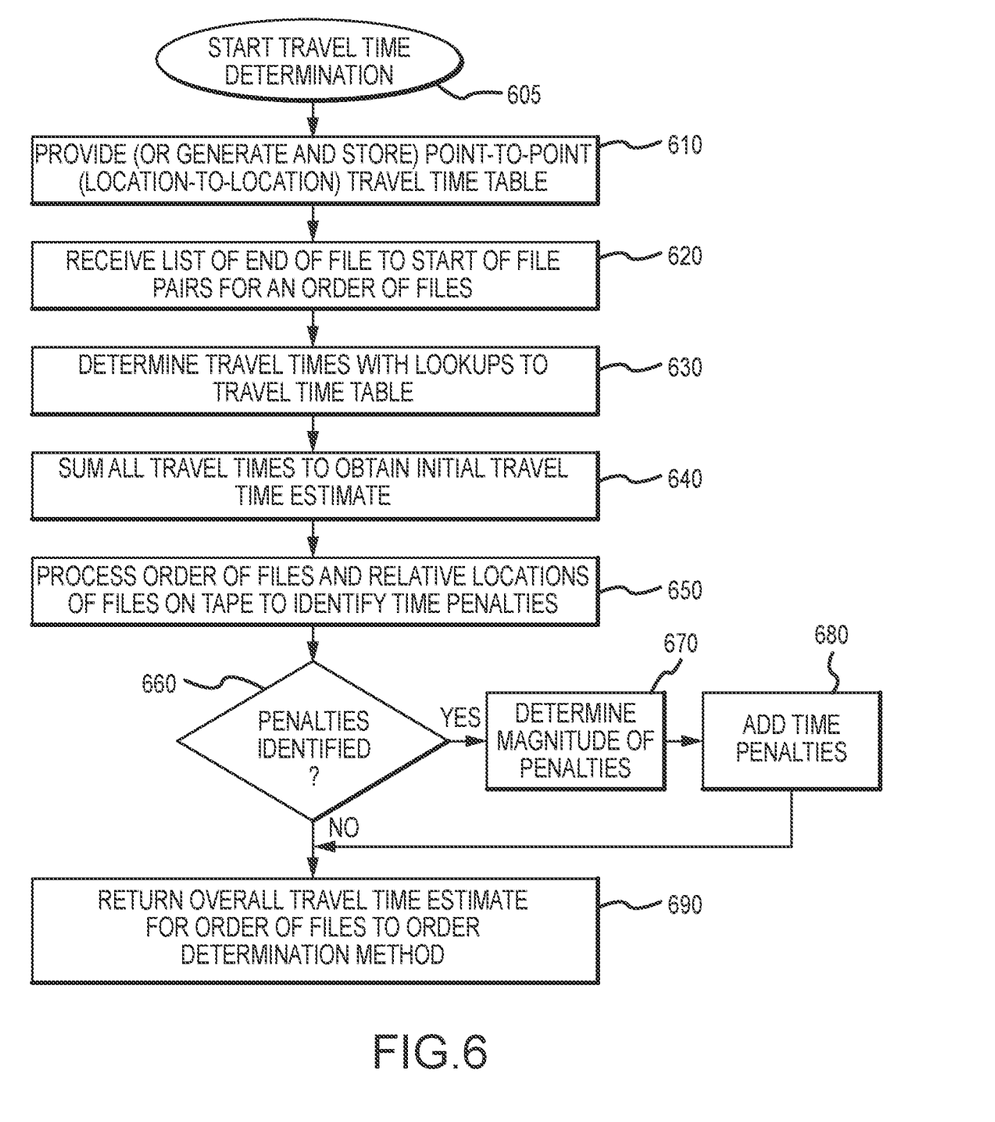
FIG. 6 is a flow diagram of a travel time determination method for use with the reorder method of FIG. 3.

With all the possible orders determined, the method 300 continues at 334 with determining the overall head travel times for each of these orders provided by a factorial routine (e.g., routine 132 of FIG. 1). FIG. 6 illustrates a travel time determination method 600 such as may be carried out by the time determination routine 138 of FIG. 1 as part of step 334. As shown, the method 600 starts at 605 such as with a determination of the number of pairs of locations or points on a tape to model with a travel velocity equation for a tape drive, e.g., the number may vary to practice the method 600 with a pair number in the range of 50,000 to 70,000 being useful and with 64,000 pairs used in one implementation by the inventor for the method 600. At 610, the method 600 involves providing, generating, and storing the point-to-point travel time table (such as table 150 in FIG. 1), which has travel times between each pair of points (or location) chosen on the tape.

The method 600 continues at 620 with receiving the order(s) of files and this may include a list of end of file and start of file pairs in the order. In other cases, the order is received and step 620 includes identifying end of file locations and next start of file locations in the file access order. The method 600 then includes at 630 determining the travel times for each of these end of file and start of file pairs with lookups to the travel time table. At step 640, the travel times are summed to obtain an initial estimate of travel time for the file access order (or reordered list of files).

The inventor recognized that while useful in some applications the estimate provided by step 640 can be improved upon by applying one or more time delays or "penalties" to these estimates when applicable. Movements of the read/write head from the end of one file to the start of another file can cause delays when compared with moving from one file to the next in the same direction and in the same wrap. In general, the greater the vertical movement of the head from one file to another the greater the delay or time penalty. More particularly, if the next file in the order is not on the same wrap a time penalty or position delay can be added to the travel time. For example, the next file start location may be "too close" to the present file end location such that there is not adequate time to move the head vertically (with "too close" being determined based on how far away the wrap containing the next file is from the current file wrap and with greater wrap separations requiring more downstream distance on the tape to allow the vertical or cross-width head movement), and this will result in a delay (e.g., stopping head movement relative to the tape and if needed backing the head position up on the tape to the start location of the next file). In other cases, the two files may overlap (in the vertical direction of the tape surface) such that the head will have to be "backed up" rather than simply traveling downstream or in the same direction, and this will cause a similar position delay. Time penalties may also be applied if the next file in the order is in a different servo band (e.g., apply a servo band penalty). These time penalties may be determined in real time based on these parameters or a plurality of common penalties may be predetermined and stored in a table for quick retrieval during performance of the method 600.

Returning to FIG. 6, the method 600 continues at 660 with a determination of whether or not the file access order being processed should have time penalties applied (e.g., files that overlap in their position along the linear length of the tape, files that are too close together for full speed movement of head in vertical direction, files that are in different servo bands, and so on). If penalty situations are identified in the order at 660, the method 600 continues at 670 with determination of the magnitude of the penalty (e.g., lookup into table or real time calculation of time delay for moving between two files in addition to distance). At 680, the one or more penalties are added to the time estimate from step 640. Then, the method 600 continues at 690 after step 680 or after step 660 if no penalty situations are identified. In step 690, the overall travel time estimate is returned to the order determination method 300 for the order of files.

Returning to FIG. 3, the method 300 then continues at 370 with providing the reordered list of files to the requesting host or user as a best access order. Then, at step 380, the method 300 may include the host using the best access order to read or write to the files on the tape in the tape drive. The method 300 then ends at step 390.

Figure 4:
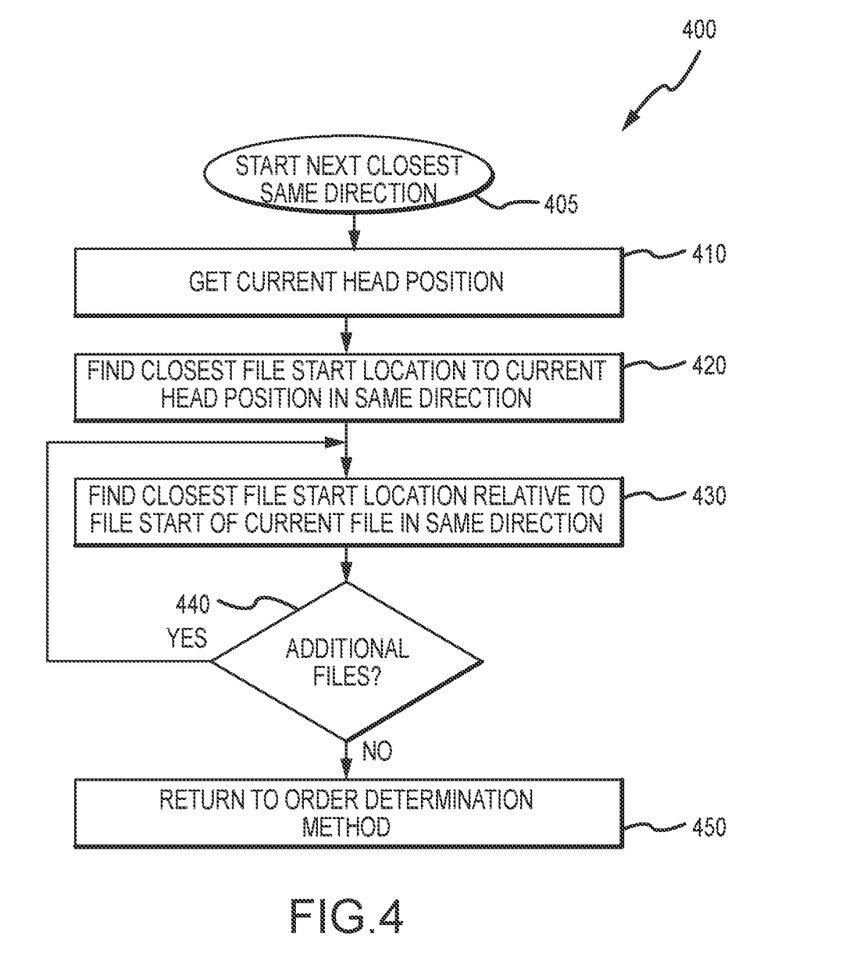
FIG. 4 is a flow diagram of an order determination method using a next closest in a same direction technique that may be carried out during the reorder method of FIG. 3.

If at step 326 the number of files is greater than the factorial routine threshold (e.g., is 11 or more), the method 300 continues step 340 with performing (such as with routine 134 of FIG. 1) a next closest ordering in the same direction. FIG. 4 illustrates a next closest in same direction method 400 that may be performed as part of step 340. The method 400 starts at 405 such as with calling routine 134 of the order determination module 130. At step 410, the method 400 continues with determining the current head position for the tape drive. Then, at step 420, the closest file start location to the current head position is determined from the file list (and the results of step 320). This closest location has to be a file in the same direction of head travel.

At step 430, the method 400 continues with finding the closest file start location relative to the file start location of the current file. Again, this next file's start location is in the same direction (although overlap may be allowed such that "same direction" may be chosen based on start locations of the files, e.g., a next closest file may be an overlapping file (e.g., a file in another wrap) along the length of the tape that has a start location upstream of the end location but downstream of the current file's start location; however, in other implementations overlapping files will be considered in the "close-by" check in step 348). At step 440, the method 400 checks for additional files in the file list being reordered. If there are more files to include in the reordered list, the method 400 continues at step 430. If not, the method 400 continues at 450 with returning the reordered list to the order determination method 300.

Referring again to FIG. 3, the method 300 continues at 344 with determining the overall travel time of the reordered list from step 340. This may involve calling the method 600 shown in FIG. 6 and discussed above with regard to step 334. The method 300 then continues at 348 with performing a close-by check to determine whether the overall time provided by the reordered list of files from step 340 can be improved upon. For example, a closest next file may be a greater vertical distance than a second closest (or close-by) file in the same direction (e.g., a closest file may be two or more wraps away or be in a different servo band). The next closest routine 400 of FIG. 4 will still choose this file even though adding of time penalties may make this a less desirable choice time-wise when compared to the second closest file, which may incur no or fewer time penalties (or the same number of penalties but of lower magnitude). Hence, at step 348, one or more additional orders may be generated that replace next closest files with second closest or close-by files in the reordered list, and the overall time estimate is repeated for this new reordered list of files. For an example of step 348, see the discussion of FIG. 7 below.

Figure 5:
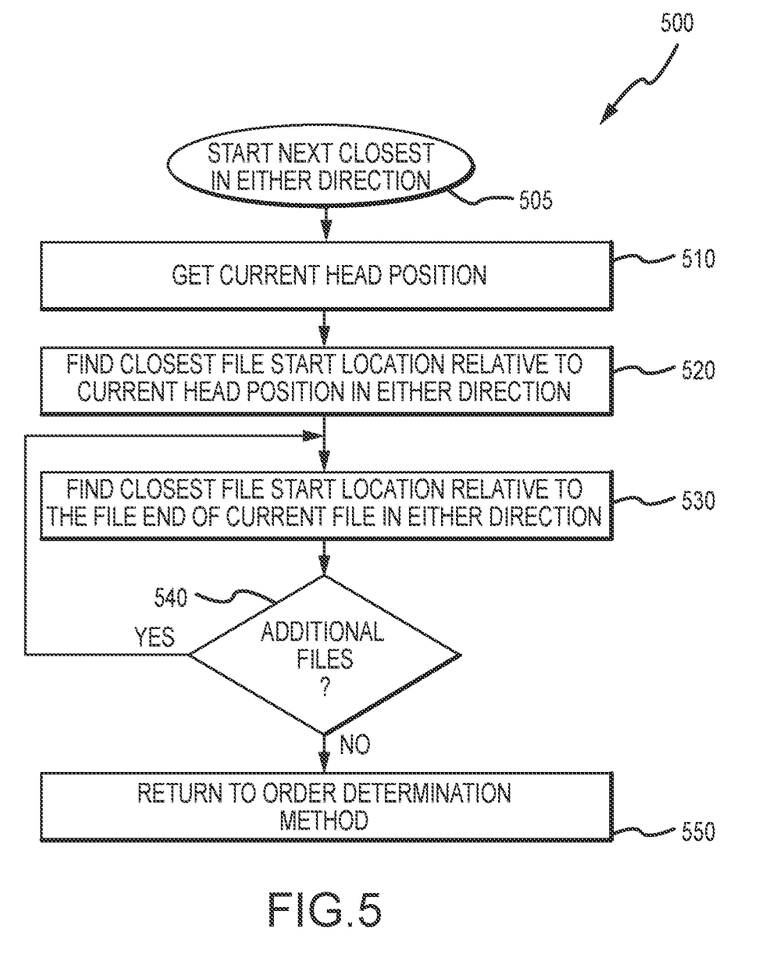
FIG. 5 is a flow diagram similar to that of FIG. 4 but showing an order determination method using a next closest in both directions technique that also may be carried out during the reorder method of FIG. 3.

The method 300 continues at step 350 with performing next closest ordering (or reordering) of the list of files in the order request, but, in contrast to step 340, the next closest file may be in either direction of head travel relative to the tape. FIG. 5 illustrates such a next closest method 500 as may be carried out by routine 136 of the order determination module 130 of FIG. 1. The method 500 starts at 405 such as with calling routine 136 of the order determination module 130. At step 510, the method 500 continues with determining the current head position for the tape drive. Then, at step 520, the closest file start location to the current head position is determined from the file list (and the results of step 320). This closest location does not have to be a file in the same direction of head travel but, instead, can be in either direction (e.g., one either side of the center line of the tape).

At step 530, the method 500 continues with finding the closest file start location relative to the file end location of the current file. Again, this next file's start location is in either direction, and overlap is allowed such that "next closest" may be chosen based simply on any file with its start of file location being closest to the end of location of the current file (as measured vertically or across (orthogonally) to the tape width in the wraps). At step 540, the method 500 checks for additional files in the file list being reordered. If there are more files to include in the reordered list, the method 500 continues at step 530. If not, the method 500 continues at 550 with returning the reordered list to the order determination method 300.

The method 300 continues at 354 with determining (such as by performance of method 600) the overall travel time for the reordered list from step 350. Then, at step 360, the method 300 involves comparing the overall travel time associated with the reordered list from step 344 and from step 354 to determine which is the shortest. In other words, step 360 determines whether the result of the next closest routine in the same direction or in both directions provides a more efficient access order. Then, at step 370, the better of the two orders is returned to the host as the best access order. At step 380, the host or user uses the best access order to read and/or write to the files on the tape. The method 300 then ends at step 390.

Figure 7:
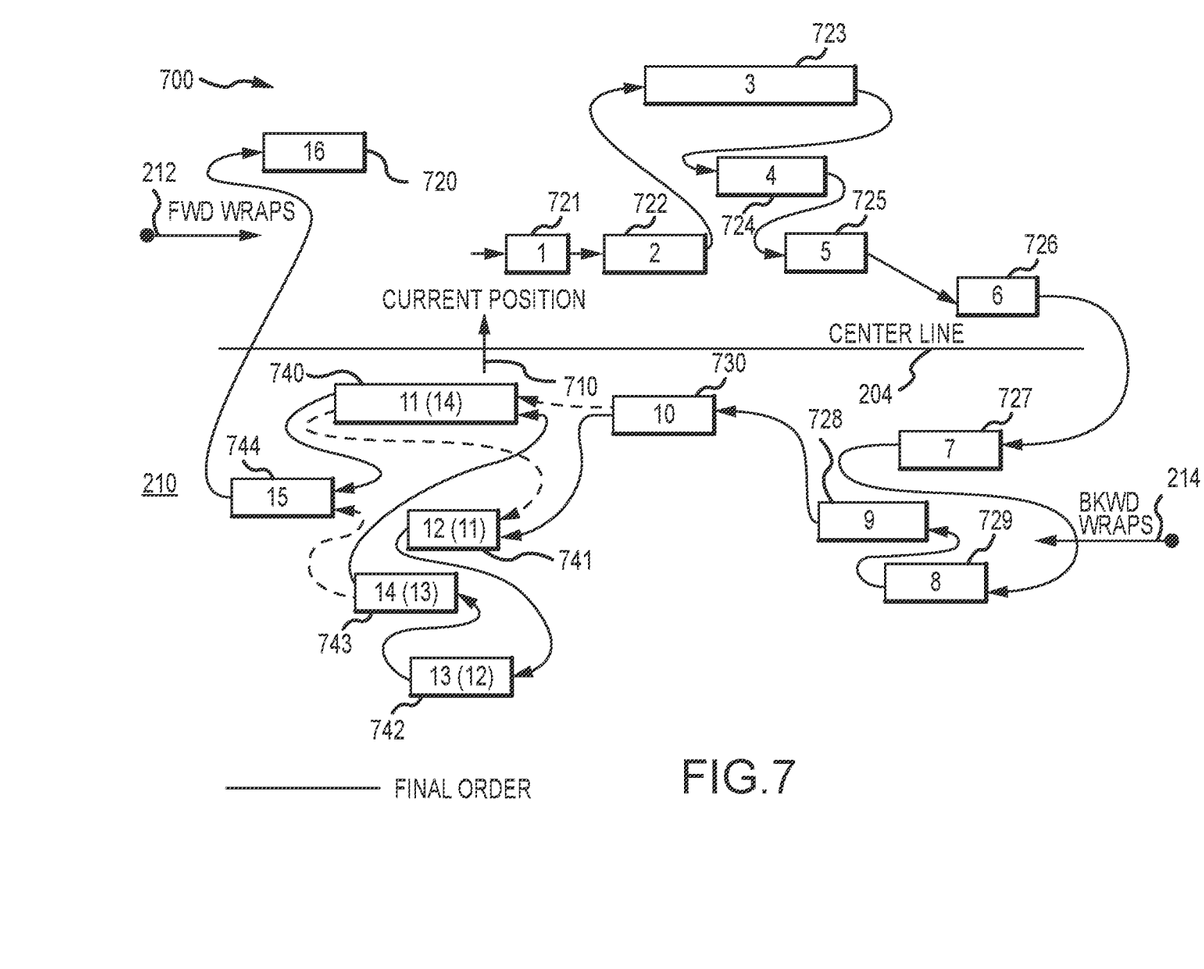
FIG. 7 illustrates schematically access orders for a set of files on a tape as determined by a next closest technique and for a next closest technique with optimization using a close-by file check.

FIG. 7 illustrates with the schematic diagram 700 performance of the next closest in the same direction routine on the tape 210 of FIG. 2. A request order may provide a list of files that are randomly written on the tape 210 as shown at 720, 721, 722, 723, 724, 725, 726, 727, 728, 729, 730, 740, 741, 742, 743, 744. The number of files is sixteen, which is greater than most factorial routine thresholds, such that the factorial routine typically will not be used in order determination as it is too time consuming (e.g., take longer than the 30 second host threshold for timeout from their order request). Using the next closest to start location (or same direction) routine, a current position of the head is found as shown with arrow 710. Then, a first file 721 with a start location closest to the current position and in the same direction (e.g., the head will move to the right to access files in wraps above the center line 204) is chosen as the first file in the reordered list. A next closest to the start of 721 file 722 is then identified and included in the reordered list, and this file 722 is in the same direction (if either direction was acceptable file 730 may be considered for next closest file).

The routine continues with determining that the next closest to the start file in the same direction is file 723 based on a start location for file 723 relative to a start location of file 722. This routine is continued until all files have been included in the reordered list, and the path or order of the files produced is shown with solid lines. Optionally, a close-by check step may then be performed to see if close-by files that were ignored in the next closest in the same direction routine because they overlapped (e.g., were not in the same direction in this implementation of the routine) with the current file. Note, the same direction algorithm sorts by start to start. In contrast the next closest (in either direction) algorithm sorts end to start. Optimization in the same direction (of data recording), next closest, start-to-start method of FIG. 7 occurs when a smaller file starts after a larger file but ends before the halfway point of the larger file. The order may be reversed for these two files as well as any subsequent files that meet the criteria (e.g., a file that starts after a prior file should be read first when the next or subsequent file is entirely within the first half of the prior file). Such reordering is shown with files 730, 740, 741, 742, 743, and 744, which would be ordered as 730, 740, 741, 742, 743, 744 without optimization but are ordered 730, 741, 742, 743, 740, and 744 with such optimization.

In performing the next closest, start-to-start routine, the servo position of a block or file may be used to determine its relative position in comparison to the other blocks or files. The distance between any two blocks or files is the beginning of the last block or file to the beginning of the next block or file. If a reposition is needed between adjacent blocks or files in the reordered list (such as between files 722 and 724), then the extra time is taken into account for the travel time between the blocks or files (e.g., as time delay or time penalty). Similarly, large wrap moves are typically taken into account as time penalties when calculating the overall travel time.

In the example of diagram 700, the first reordering involves going to the next closest block or file relative to the current position (start of block or file) in the ordering in the same direction of head travel. The theory being that if the drive is kept streaming in one direction then the best performance is likely obtained. However, in this example of diagram 700 and some other cases, this is not optimal (does not produce the shortest overall travel time). A close-by check is made to see if a file that is nearby provides a better overall access or travel time, and this is shown in FIG. 7 (e.g., with file 723 being accessed before file 724 rather than after file 726 as may be the case if next closest in same direction were applied without performing the close-by check/process to provide an alternative(s) reordered list).

Figure 8:
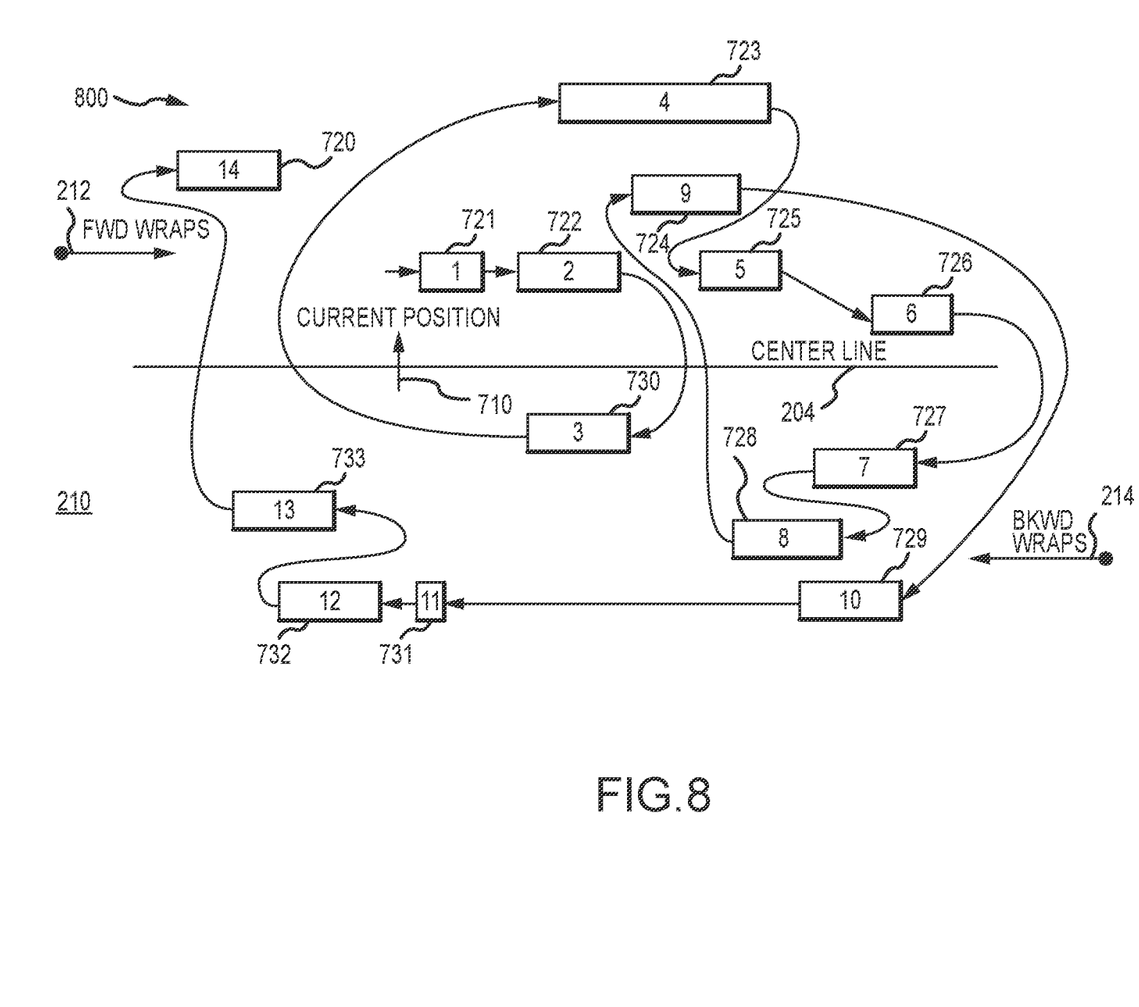
FIG. 8 illustrates schematically an access order for a set of files (same set as shown in FIG. 7) on a tape as determined by a next closet in both directions technique.

FIG. 8 illustrates with the schematic diagram 800 performance of the next closest in both directions (or either direction of head travel or regardless of the direction the files were recorded) routine on the tape 210 of FIG. 2. A request order may provide a list of files that are randomly written on the tape 210 as shown at 720, 721, 722, 723, 724, 725, 726, 727, 728, 729, 730, 731, 732, and 733. The number of files is fourteen, which is greater than most factorial routine thresholds, such that the factorial routine typically will not be used in order determination as it is too time consuming. Using this next closest routine, a current position of the head is found as shown with arrow 710. Then, a first file 721 with a start location closest to the current position in either direction is chosen as the first file in the reordered list.

A next closest file 722 is then identified and included in the reordered list. This file 722 is in the same direction but this is not required in this next closest routine. Particularly, after file 722, the routine acts to identify file 730 as the next closest file even though it is accessed in the opposite direction as file 722. Then, file 723 is found to be the next closest after file 730 rather than file 731 (which is accessed in the same direction as file 730). The process continues until a complete reordered file list is generated (as shown with solid lines with arrow heads connecting all files and defining an access path for the tape 210 for this set of files). A quick comparison of the reordering of FIGS. 7 and 8 will allow one to note that the two file access orders are quite different even for this small number of files or blocks. The method 300 of FIG. 3 would then involve determining overall travel times for both of (or all three of) the file access orders and choosing the shortest one for return to a host as a best access order.

Figure 9:
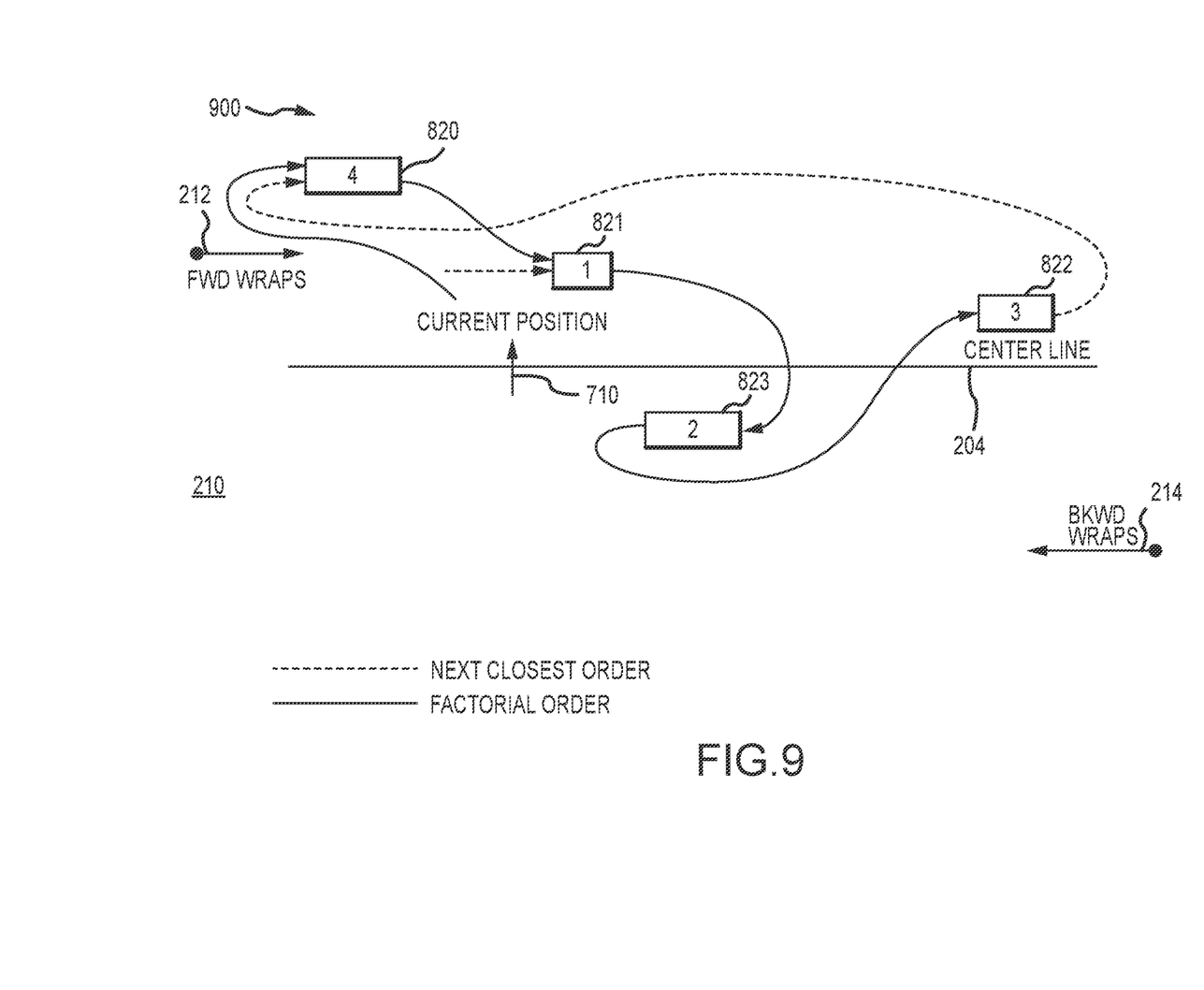
FIG. 9 illustrates schematically access orders for a small set of files as determined by a next closest technique and by a factorial process.

FIG. 9 illustrates with the schematic diagram 900 performance of the factorial routine on the tape 210 of FIG. 2. A request order may provide a list of files that are randomly written on the tape 210 as shown at 820, 821, 822, and 823.

The number of files is only four, which is less than most factorial routine thresholds (e.g., less than ten), such that the factorial routine typically is appropriate for use in order determination as it is not too time consuming for responding to this order request. Using the factorial routine, every possible order of these four files is determined and an overall travel time is determined.

The best access order using the factorial routine is shown with the solid lines showing the order, i.e., file 820, file 821, file 823, and then file 822. In contrast, an access order provided by a next closest routine in both directions is shown with dashed lines as being file 821, file 823, file 822, and then file 820. Applying the next closest routine does not produce the most efficient access order in this case, which is why the factorial routine is preferred when time allows or when the number of files is relatively small (e.g., 10 or less files in the order request). The factorial routine provides an access order (as shown with solid lines) that avoids the traverse from end-of-tape (EOT) to beginning-of-tape (BOT) to read file 820. Reading from BOT to EOT then EOT to BOT also would not be as efficient as the order shown by the factorial routine.

Figure 10:
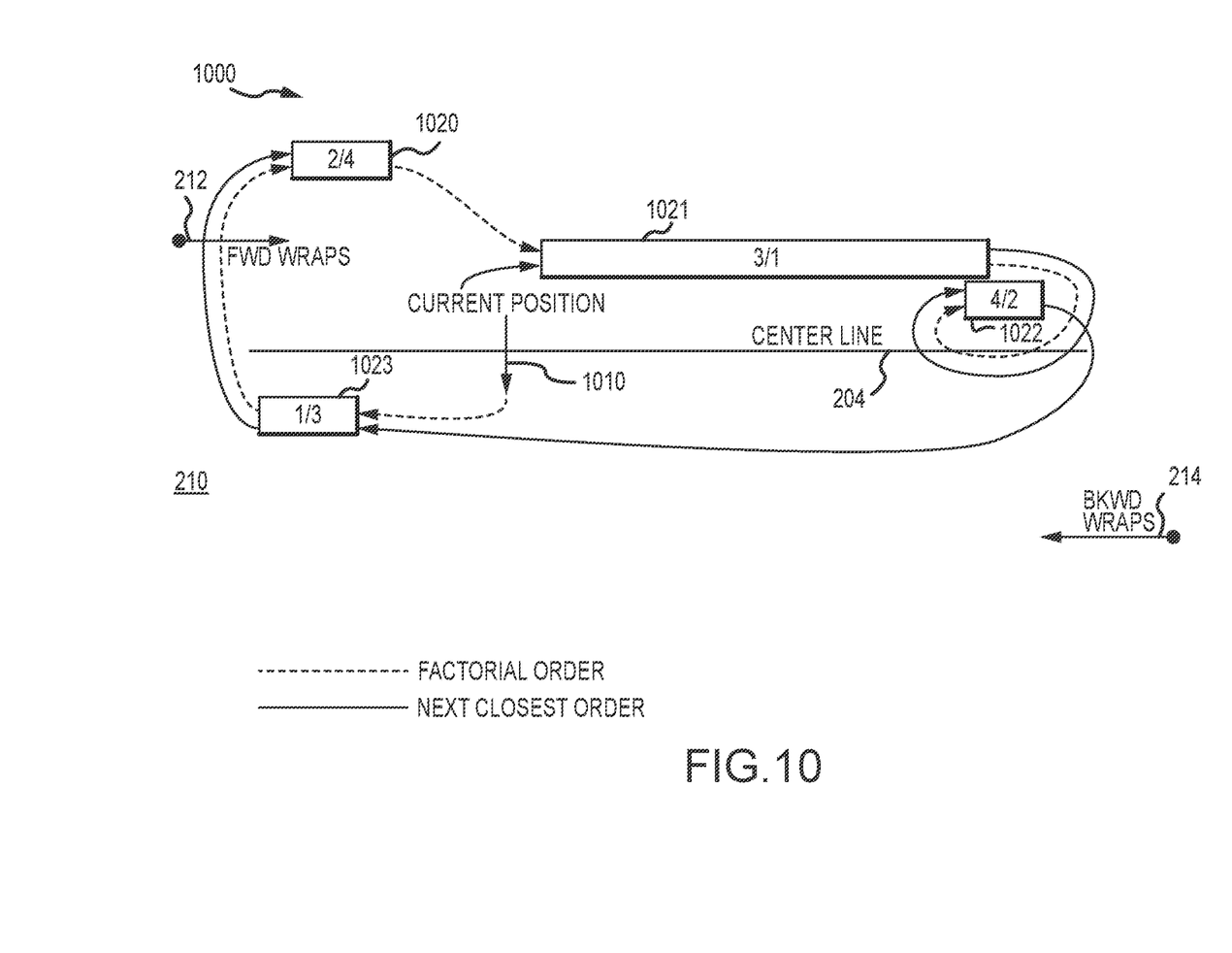
FIG. 10 illustrates schematically access orders for a set of files with mixed sizes using a next closest technique and a factorial process.

Similarly, FIG. 10 illustrates with the schematic diagram 1000 performance of the factorial routine on the tape 210 of FIG. 2. A request order may provide a list of files that are randomly written on the tape 210 as shown at 1020, 1021, 1022, and 1023. In contrast to the files shown in FIG. 9, the files in FIG. 10 are of a mixed size with some small files (such as file 1022) and some relatively large files (such as file 1021). The number of files is only four, which is less than most factorial routine thresholds (e.g., less than ten), such that the factorial routine typically is appropriate for use in order determination as it is not too time consuming for responding to this order request. Using the factorial routine, every possible order of these four files is determined and an overall travel time is determined.

The best access order using the factorial routine is shown with the solid lines showing the order, i.e., file 1021, file 1022, file 1023, and then file 1020. In contrast, an access order provided by a next closest routine in the same direction is shown with dashed lines as being file 1023, file 1020, file 1021, and then file 1022. Applying the next closest routine does not produce the most efficient access order in this case. The factorial routine is more effective in this mixed file size example because the next closest routine would choose block 1023 first rather than block 1021 due to the current head position at 1010, and this access order would cause traversing the tape 210 twice when only one traverse is required as shown with the solid line order provided by the factorial routine. To understand why the order generated by the factorial routine is more time efficient, it is at least partially due to the significant time it takes to traverse the larger block 1021.

The above described invention including the preferred embodiment and the best mode of the invention known to the inventor at the time of filing is given by illustrative examples only. It will be readily appreciated that many deviations may be made from the specific embodiments disclosed in the specification without departing from the spirit and scope of the invention.

As will be appreciated by the above discussion, reading files in file order is not always efficient as the files may be the length of the tape apart (e.g., 1000 meters apart). Files are recorded in wraps (e.g., sets of tracks written in parallel) in a serpentine manner back and forth through the length of the tape N times, where N is on the order of 130 in many cases. It is more efficient, as taught herein, to read files or data sets (or blocks) that are located near each other positionally on the tape but that may be far apart by wrap (in different wraps). Reading files that are close to each other, but on different wraps, reduces the time to recover random data sets on the tape. The order determination method taught is useful for providing a best access order that is useful in many situations such as for use with large sets of related data or to recover incremental write updates to archived data (e.g., aids in recovering all the files associated with the data at a particular time).

I claim:

1. A tape drive for providing best access order for data on a tape, comprising:
a processor;
memory storing a file location table for a tape loaded into the tape drive, wherein the file location table includes identifiers for a plurality of files on the tape and location information for the plurality of files on the tape; and
an order determination module, executed by the processor, processing an order request comprising a list including a number of the files on the tape to generate, based on the location information in the file location table, a reordered list defining an order for accessing the number of the files on the tape, wherein an access time for the number of the files for the reordered list is less than for an order of files in the list of the order request.

2. The tape drive of claim 1, wherein the order determination module further comprises a time determination routine processing each of the possible orders in the set of all possible orders to determine an access time for the number of the files and wherein the order determination module selects the reordered list as an order from the set of all possible orders with a shortest of the access times.

3. The tape drive of claim 2, wherein the time determination routine determines the access times based on a distance between start of file locations for pairs of adjacent ones of the files in each of the possible orders and by adding time penalties when a next one of the files in one of the possible orders is in a different wrap or in a different servo band on the tape.

4. The tape drive of claim 2, wherein a time determination table is stored in the memory and the determination of the access times comprises looking up travel times between pairs of the end and start of file locations.

5. The tape drive of claim 1, wherein the order determination module includes a factorial routine that is performed when the number of the files is less than or equal to a threshold value and wherein the factorial routine generates a set of all possible orders for accessing the number of the files.

6. The tape drive of claim 5, wherein the threshold value is 10.

7. A tape drive for providing best access order for data on a tape, comprising:
a processor;
memory storing a file location table for a tape loaded into the tape drive, wherein the file location table includes identifiers for a plurality of files on the tape and location information for the plurality of files on the tape; and
an order determination module, executed by the processor, processing an order request comprising a list including a number of the files on the tape to generate, based on the location information in the file location table, a reordered list defining an order for accessing the number of the files on the tape, wherein an access time for the number of the files for the reordered list is less than for an order of files in the list of the order request, wherein the order determination module includes a factorial routine that is performed when the number of the files is less than or equal to a threshold value, wherein the factorial routine generates a set of all possible orders for accessing the number of the files, wherein the order determination module includes a next closest in same direction routine outputting a first reordered list and a next closest in both directions routine outputting a second reordered list that are both performed when the number of the files is greater than the threshold value, and wherein the order determination module compares an access time associated with the first ordered list with an access time associated with the second reordered list to determine which is shorter to select as the reordered list.

8. The tape drive of claim 7, wherein the next closest in same direction routine generates the first reordered list by choosing next ones of the files in the list of the order request by finding a next file that has a closest start of file location relative to a start of file of a current one of the files in the list, with the next file being in same head travel direction as the current one of the files.

9. The tape drive of claim 7, wherein the next closest in both directions routine generates the second reordered list by choosing next ones of the files in the list of the order request by finding a next file that has closest start of file location relative to an end of file of a current one of the files in the list with the next file being in either head travel direction on the tape.

10. A tape drive comprising:
a processor executing code to provide an order determination module for receiving an order request from a host and for, in response, generating a best access order for a set of files on a tape loaded in the tape drive and identified in the order request, the order determination module comprising:
a first ordering routine producing a first access order of the files by selecting a first file closest to a current head position in a current direction of travel of the tape drive as a current file, identifying a next closest one of the files with a start of file location nearest to a start of file location of the current file and in the current direction of travel, and repeating the identifying step with the next closest file as the current file; and
a second ordering routine producing a second access order of the files by selecting a first file closest to the current head position without regard to the current direction of travel of the tape drive as a current file, identifying a next closest one of the file with a start of file location nearest to an end of file location of the current file, and repeating the identifying step with the next closest file as the current file,
wherein the order determination module assigns the one of the first and second assess orders that has a shorter overall travel time as the best access order.

11. The tape drive of claim 10, wherein the order determination module further comprises a third ordering routine producing the best access order by generating each possible order of accessing the files on the tape and by selecting a one of the possible orders with a shortest overall travel time.

12. The tape drive of claim 11, wherein the third ordering routine is performed when the files number less than 10.

13. The tape drive of claim 10, further comprising memory storing a time determination table comprising a number of pairs of locations on the tape and a travel time assigned to each of the pairs.

14. A tape drive comprising:
a processor executing code to provide an order determination module for receiving an order request from a host and for, in response, generating a best access order for a set of files on a tape loaded in the tape drive and identified in the order request, the order determination module comprising:
a first ordering routine producing a first access order of the files by selecting a first file closest to a current head position in a current direction of travel of the tape drive as a current file, identifying a next closest one of the files with a start of file location nearest to a start of file location of the current file and in the current direction of travel, and repeating the identifying step with the next closest file as the current file;
a second ordering routine producing a second access order of the files by selecting a first file closest to the current head position without regard to the current direction of travel of the tape drive as a current file, identifying a next closest one of the file with a start of file location nearest to an end of file location of the current file, and repeating the identifying step with the next closest file as the current file, wherein the order determination module assigns the one of the first and second assess orders that has a shorter overall travel time as the best access order; and
memory storing a time determination table comprising a number of pairs of locations on the tape and a travel time assigned to each of the pairs,
wherein the order determination module determines overall travel times for the first and second access orders by looking up each of the pairs in the time determination table to determine associated ones of the travel times and by summing the determined ones of the travels times.

15. A method for generating a best access order for a tape loaded onto a tape drive, comprising:
from a host or user, receiving an order request for the tape identifying a number of files on the tape;
retrieving locations of the files on the tape from a file location table stored in memory;
generating a first access order for the files by successively determining a next closest file in a current travel direction starting with one of the files most proximate to the current head position and continuing until the first access order includes all of the files;
generating a second access order for the files by successively determining a next closest file in either travel direction starting with one of the files most proximate to the current head position and continuing until the second access order includes all of the files;
determining an overall travel time for the first and second access orders; and
returning the one of the first and second access orders with a shorter one of the overall travel times to the host or user.

16. The method of claim 15, wherein the determining of the overall travel time comprises retrieving from a table in memory predefined travel times between end of file locations and start of file locations in adjacent ones of the files in the first and second access orders.

17. The method of claim 16, wherein the table includes the predefined travel times between at least about 50,000 pairs of locations on the tape.

18. The method of claim 15, further comprising, when the files number less than or equal to a predefined threshold number, determining all possible access order for the files on the tape and returning one of the possible access orders with a shortest travel time to the host or user as the best access order.

19. The method of claim 18, wherein the predefined threshold number is 10.

20. The method of claim 15, wherein the next closest file is determined by choosing one of the files with a shortest distance from an end of file of a current one of the files to a start of file location of the one of the files.

* * * * *

UNITED STATES PATENT AND TRADEMARK OFFICE
CERTIFICATE OF CORRECTION

PATENT NO. : 9,696,915 B2  
APPLICATION NO. : 15/336457  
DATED : July 4, 2017  
INVENTOR(S) : Whitney Page 1 of 1

It is certified that error appears in the above-identified patent and that said Letters Patent is hereby corrected as shown below:

In the Specification

In Column 4, Line 57, delete "Tw," and insert -- $T_w$, --, therefor.

In the Claims

In Column 14, Line 2, in Claim 12, after "number" insert -- is --.

In Column 15, Line 5, in Claim 18, after "number" insert -- is --.

Signed and Sealed this  
Twenty-seventh Day of March, 2018

Andrei Iancu  
*Director of the United States Patent and Trademark Office*